Patented Aug. 17, 1943

2,327,052

UNITED STATES PATENT OFFICE 2,327,052

VULCANIZATION OF RUBBER

Roger A. Mathes, Akron, Ohio, assignor to The B. F. Goodrich Company, New York, N. Y., a corporation of New York No Drawing. Application January 27, 1941, Serial No. 376,177

6 Claims. (Cl. 260—785)

This invention relates to the vulcanization of rubber and pertains specifically to the acceleration of vulcanization in the presence of the thiazolinyl thiazyl monosulfides.

It has long been known that the vulcanization of rubber can be accelerated by the presence of various compounds, notably organic sulfur-containing compounds. Of this group the 2-mercapto thiazolines, it has been reported, are weak accelerators, although they are very similar in structure to the 2-mercapto thiazoles which are excellent accelerators. I have now discovered that a mixed thiazolinyl thiazyl monosulfide, contrary to expectations, is an excellent accelerator when used in conjunction with a monocarboxylic acid or its metallic salt.

The acids which may be used to activate my new accelerator comprise saturated and unsaturated monocarboxylic acids such as caprylic, lauric, stearic, linoleic, linolenic, palmitic, benzoic, salicylic, and the like; or the salts of the above acids with sodium, magnesium, lead, tin, zinc, or any other alkali, alkaline earth, or heavy metal may be used. Although mere traces of these substances activate my new compounds, I prefer to use from 1% to 5% or more in the rubber composition.

The thiazolinyl thiazyl monosulfides may be prepared by reacting a 2-halo alkyl or aryl thiazole with a 2-mercapto thiazoline or a salt thereof; or by reacting a 2-mercapto alkyl or aryl thiazole or metallic salt thereof with a 2-halo thiazoline. The thiazole ring of the monosulfide produced may be substituted in the 4 or 5 position with hydrocarbon or alkoxy groups, as for example in benzothiazyl, 4-methyl thiazyl, 5-methyl thiazyl, 4,5-dimethyl thiazyl, 4-ethyl thiazyl, 4,5-diethyl thiazyl, 4,5-tetramethylene thiazyl, 4-methoxy thiazyl, and various substituted benzothiazyls in which the aromatic ring contains nitro, amino, halo, and other groups as for example 6-nitrobenzothiazyl, 5-chlorobenzothiazyl, 6-aminobenzothiazyl, and the like. The thiazoline nucleus of the monosulfide compound may also be substituted in the 4 or 5 position, as for example in 4-methyl thiazolinyl, 5-methyl thiazolinyl, 4,5-dimethyl thiazolinyl, 4-ethyl thiazolinyl, 5-ethyl thiazolinyl, 4,5-diethyl thiazolinyl, 4,5-tetramethylene thiazolinyl, 4-methoxy thiazolinyl, 4-phenyl thiazolinyl, 4-p-aminophenyl thiazolinyl, and the like.

As a specific example of my invention, I have prepared 6-nitrobenzothiazyl thiazolinyl sulfide. To a solution of 17.9 g. of 2-mercapto thiazoline and 6.6 g. sodium hydroxide in 200 ml. of methanol was added, with stirring, 32.2 g. of 6-nitro 2-chlorobenzothiazole. The mixture was refluxed two hours, cooled, filtered, and diluted with water. The product was filtered off and allowed to crystallize. The reaction is believed to take place as follows:

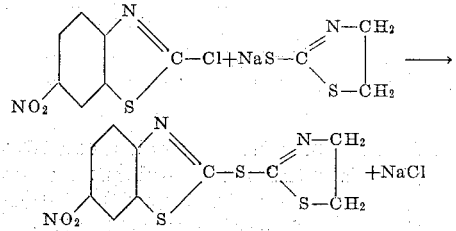

I have also prepared benzothiazyl thiazolinyl sulfide. A mixture of 35.7 g. of mercapto thiazoline and 51 g. of chlorobenzothiazole in 250 ml. of toluene was refluxed for two hours, allowed to cool, filtered, and the toluene removed by evaporation. The product is an oil which crystallizes slowly on standing.

When the 6-nitrobenzothiazyl thiazolinyl sulfide was compounded in the following rubber composition:

| | |
|---|---|
| Rubber | 100.0 |
| Zinc oxide | 5.0 |
| Sulfur | 3.5 |
| Lauric acid | 3.0 |
| 6-nitrobenzothiazyl thiazolinyl sulfide | 1.0 | and cured at 287° F., a stock with the following properties was obtained, where T=tensile strength in pounds per square inch and E=elongation in percent:

| Time of cure min. | T | E |
|---|---|---|
| 15 | 1,500 | 980 |
| 30 | 2,950 | 765 |
| 60 | 2,960 | 715 |

As these results indicate, a stock with good tensile strength characteristics is obtained in a very short time when cured under the usual conditions. Similar results are obtained with benzothiazyl thiazolinyl sulfide, or with any other member of the class of compounds set forth above.

My new accelerators are effective not only with natural rubber or caoutchouc, but also with balata, gutta percha, latex, rubber isomers, or any synthetic rubber which can be vulcanized, that is, which loses its property of thermoplasticity and becomes elastic when heated in the presence of sulfur, and the term "a rubber" is used in the claims to designate all of the above-mentioned materials.

Other materials, such as pigments, fillers, reinforcing agents, softeners, antioxidants, other accelerators, etc. may be present.

Any of the usual methods of vulcanization, such as heating in a mold, in hot water, steam, hot air, etc., gives a satisfactory product with my new compounds.

The rubber stocks made with my accelerators are not limited in their use, but are applicable to a wide variety of products, such as pneumatic and solid tires, belts, hose, footwear, latex-dipped goods, surgical goods, all kinds of molded products, and the like.

Although I have herein disclosed specific examples of my invention, I do not intend to limit myself solely thereto, but only to the spirit and scope of the appended claims.

I claim:

1. The process of vulcanizing a rubber in the presence of a compound having the structure

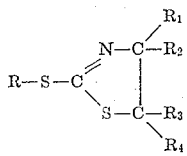

in which R is a member of the class consisting of 2-thiazyl, 2-(alkylthiazyl), 2-(alkoxythiazyl), 2-benzothiazyl, 2-(nitrobenzothiazyl), 2-(aminobenzothiazyl), and 2-(halobenzothiazyl) groups, and $R_1$, $R_2$, $R_3$, and $R_4$ are members of the class consisting of hydrogen, hydrocarbon, and alkoxy groups; and in the presence of a member of the class consisting of monocarboxylic acids and their metallic salts.

2. The process of vulcanizing a rubber in the presence of 2-benzothiazyl 2-thiazolinyl monosulfide and a member of the class consisting of monocarboxylic acids and their metallic salts.

3. The process of vulcanizing a rubber in the presence of 2-(6-nitrobenzothiazyl) 2-thiazolinyl monosulfide and a member of the class consisting of monocarboxylic acids and their metallic salts.

4. A composition comprising a rubber vulcanized in the presence of a compound having the structure

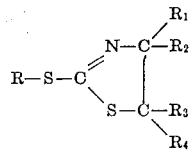

in which R is a member of the class consisting of 2-thiazyl, 2-(alkylthiazyl), 2-(alkoxythiazyl), 2-benzothiazyl, 2-(nitrobenzothiazyl), 2-(aminobenzothiazyl), and 2-(halobenzothiazyl) groups, and $R_1$, $R_2$, $R_3$, and $R_4$ are members of the class consisting of hydrogen, hydrocarbon, and alkoxy groups; and in the presence of a member of the class consisting of monocarboxylic acids and their metallic salts.

5. A composition comprising a rubber vulcanized in the presence of 2-benzothiazyl 2-thiazolinyl monosulfide and a member of the class consisting of monocarboxylic acids and their metallic salts.

6. A composition comprising a rubber vulcanized in the presence of 2-(6-nitrobenzothiazyl) 2-thiazolinyl monosulfide and a member of the class consisting of monocarboxylic acids and their metallic salts.

ROGER A. MATHES.